(12) United States Patent
Tuttle

(10) Patent No.: US 8,031,054 B2
(45) Date of Patent: Oct. 4, 2011

(54) MULTI-ANTENNA ELEMENT SYSTEMS AND RELATED METHODS

(75) Inventor: John R Tuttle, Boulder, CO (US)

(73) Assignee: Round Rock Research, LLC, Mt. Kisco, NY (US)

( * ) Notice: Subject to any disclaimer, the term of this patent is extended or adjusted under 35 U.S.C. 154(b) by 1221 days.

(21) Appl. No.: 11/691,822

(22) Filed: Mar. 27, 2007

(65) Prior Publication Data

US 2008/0238684 A1 Oct. 2, 2008

(51) Int. Cl.
*H04Q 5/22* (2006.01)

(52) U.S. Cl. .................... 340/10.5; 340/572.7

(58) Field of Classification Search ............... 340/10.42, 340/10.4, 572.7; 343/700, 850
See application file for complete search history.

(56) References Cited

U.S. PATENT DOCUMENTS

| | | | |
|---|---|---|---|
| 4,471,344 A | 9/1984 | Williams | |
| 4,816,839 A | 3/1989 | Landt | |
| 5,430,441 A | 7/1995 | Bickley et al. | |
| 5,719,586 A | 2/1998 | Tuttle | |
| 5,771,021 A | 6/1998 | Veghte et al. | |
| 5,977,914 A * | 11/1999 | Harano | 343/700 MS |
| 6,147,605 A | 11/2000 | Vega et al. | |
| 6,243,013 B1 | 6/2001 | Duan et al. | |
| 6,265,977 B1 | 7/2001 | Vega et al. | |
| 6,424,263 B1 * | 7/2002 | Lee et al. | 340/572.7 |
| 6,509,217 B1 | 1/2003 | Reddy | |
| 6,914,562 B2 | 7/2005 | Forster | |
| 6,930,639 B2 * | 8/2005 | Bauregger et al. | 343/700 MS |
| 7,023,385 B2 | 4/2006 | Harihara | |
| 7,084,740 B2 | 8/2006 | Bridgelall | |
| 7,098,850 B2 | 8/2006 | King et al. | |
| 7,102,520 B2 | 9/2006 | Liu et al. | |
| 7,102,523 B2 | 9/2006 | Shanks et al. | |
| 7,156,312 B2 | 1/2007 | Becker et al. | |
| 7,561,107 B2 * | 7/2009 | Al-Mahdawi | 343/700 MS |
| 2005/0206568 A1 | 9/2005 | Phillips et al. | |
| 2006/0119487 A1 * | 6/2006 | Atkinson et al. | 340/825.72 |
| 2006/0227051 A1 | 10/2006 | Yamamoto et al. | |
| 2007/0013486 A1 * | 1/2007 | Yeoh et al. | 340/10.34 |

FOREIGN PATENT DOCUMENTS

| | | |
|---|---|---|
| KR | 19990032317 A | 5/1999 |
| KR | 20050075966 A | 7/2005 |

OTHER PUBLICATIONS

"Two RF Inputs Make a Better RFID Tag", Symbol White Paper, May 2006.
J. Guterman, et al., "Quasi-omnidirectional dual-band back-to-back E-shaped patch antenna for laptop applications", Electronic Letters, Jul. 20, 2006, vol. 42, No. 15.
PCT/US08/57272—International Search Report (mailed Jul. 31, 2008).
PCT/US08/57272—Written Opinion (mailed Jul. 31, 2008).

* cited by examiner

*Primary Examiner* — Vernal Brown

(74) *Attorney, Agent, or Firm* — Lerner, David, Littenberg, Krumholz & Mentlik, LLP

(57) ABSTRACT

Multi-Antenna element systems and related methods. At least some of the illustrative embodiments comprise a radio frequency identification (RFID) tag comprising an antenna system. The antenna system comprises a ground plane, a first antenna element on a first side of the ground plane, and a second antenna element on a second side of the ground plane opposite first antenna element. The illustrative RFID tag further comprises a first radio frequency identification circuit coupled to the first antenna element.

12 Claims, 4 Drawing Sheets

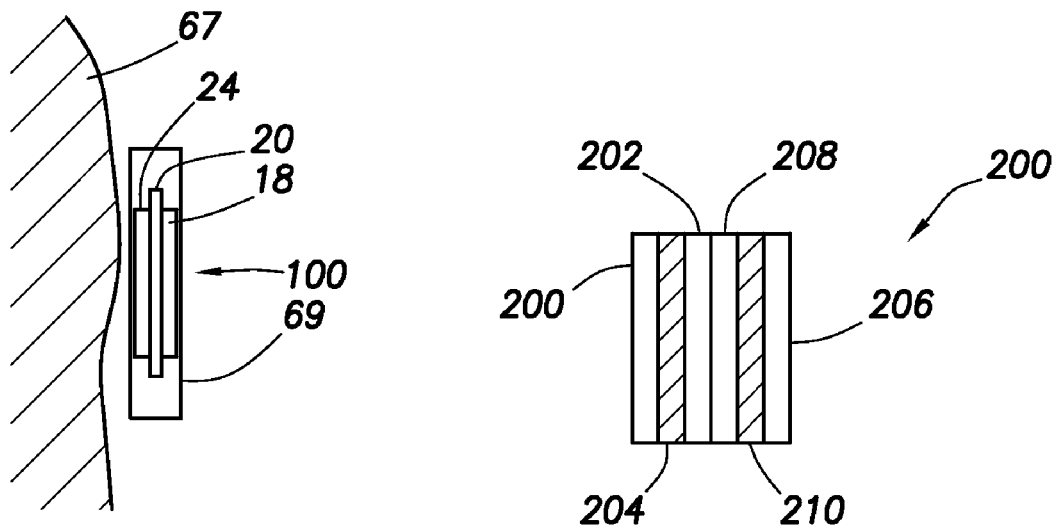
FIG.7
FIG.10
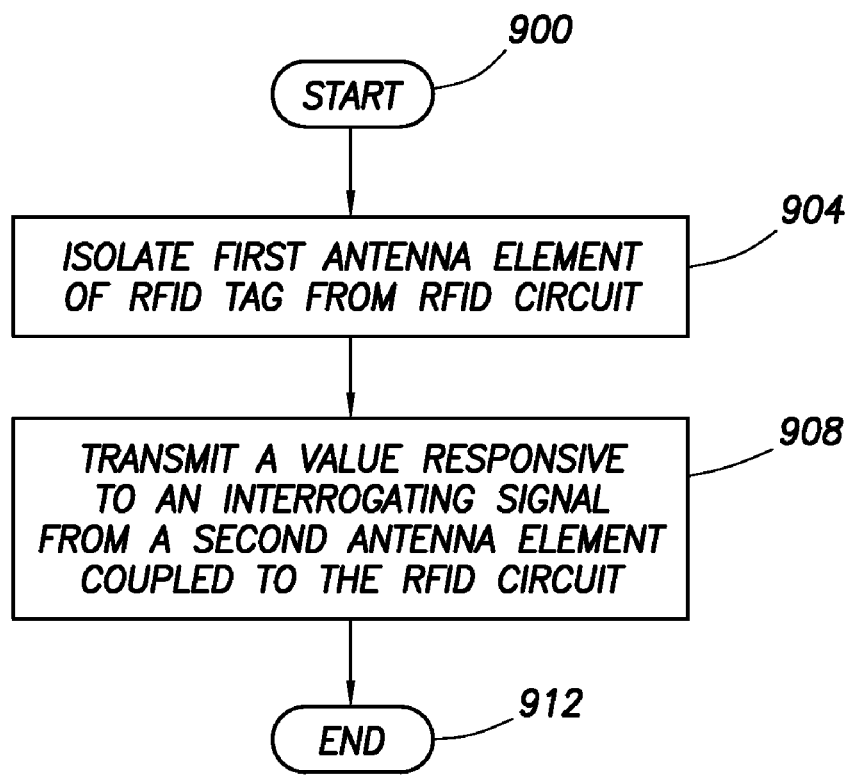
FIG.9

MULTI-ANTENNA ELEMENT SYSTEMS AND RELATED METHODS

BACKGROUND

1. Field

At least some of the various embodiments are directed to radio frequency identification (RFID) tags for use with metallic articles and/or bodies of living organisms.

2. Description of the Related Art

Radio frequency identification (RFID) tags are used in applications such as goods identification in wholesale and retail sales, access cards (e.g., building access, garage access), and badging and identification of employees. Certain RFID tags use a dipole antenna or a loop antenna as the mechanism to receive interrogating or reader signals, and respond to reader signals. However, while dipole and loop and antennas work well in free space applications, when placed close to metallic articles or water (e.g., a human or animal body), antenna performance is severely degraded, in some cases rendering the RFID tag inoperable.

Other antenna types, such as "patch antennas," also suffer performance degradation when proximate to metallic objects or water. Patch antennas are made of a metallic radiative element (the patch), placed over a ground plane that is also metallic. The patch antenna radiates (or receives) in a direction substantially perpendicular to a plane defined by the metallic radiative element, with the radiation (or reception) pattern being present on the same side of the ground plane as the radiative element. However, when the radiative element becomes positioned between the ground plane and a metallic article or animal body, the patch antenna performance is severely degraded.

As a specific example, consider an employee badge suspended on the employee's chest or belt, and the badge having an RFID tag with a patch antenna. When the ground plane of the patch antenna is between the radiative element and the employee's body, the patch antenna works properly; however, when the badge is turned around, the radiative element is shielded between the ground plane and the employee's body and thus the RFID tag may not operate properly. If the employee badge comprises a dipole or loop antenna rather than the patch antenna, suspending the tag proximate to the employee's body detunes the antenna and/or severely affects the directivity of the antenna. In either case, operation of the RFID tag is severely degraded.

BRIEF DESCRIPTION OF THE DRAWINGS

For a detailed description of various embodiments, reference will now be made to the accompanying drawings in which:

FIG. 7 shows an elevational, cross-sectional view of a badge comprising dual-sided patch antenna proximate to a body;

FIG. 9 shows a method in accordance with at least some embodiments; and

FIG. 10 shows an elevational view of a dual-sided patch antenna in accordance with alternative embodiments.

NOTATION AND NOMENCLATURE

Certain terms are used throughout the following description and claims to refer to particular system components. As one skilled in the art will appreciate, design and manufacturing companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or direct connection. Thus, if a first device couples to a second device, that connection may be through a direct connection or through an indirect connection via other intermediate devices and connections. Moreover, the term "system" means "one or more components" combined together. Thus, a system can comprise an "entire system," "subsystems" within the system, a radio frequency identification (RFID) tag, a RFID reader, or any other device comprising one or more components.

DETAILED DESCRIPTION

The various embodiments disclosed herein are discussed in the context of radio frequency identification (RFID) tags and antennas for RFID tags; however, the systems, antennas and methods discussed herein have application beyond RFID tags to other types of radio frequency technologies. The discussion of any embodiment in relation to RFID tags is meant only to be illustrative of that embodiment, and not intended to intimate that the scope of the disclosure, including the claims, is limited to that embodiment.

Figure 1:
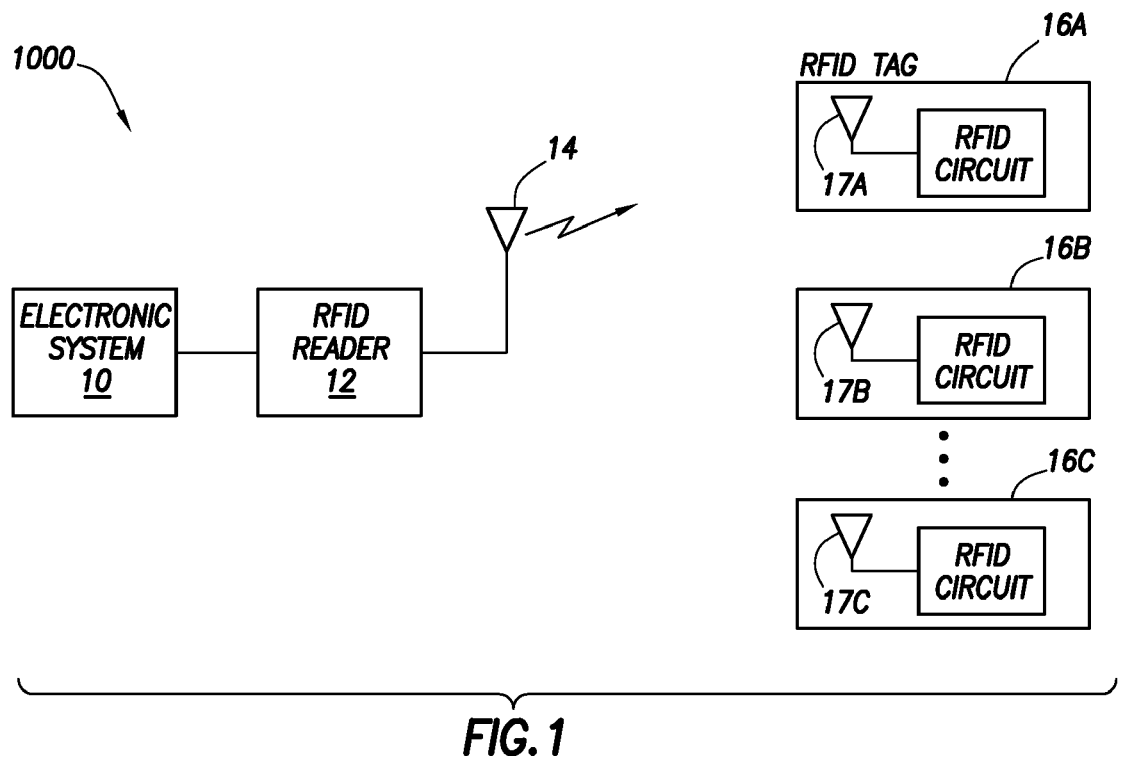
FIG. 1 shows a system in accordance with at least some embodiments.

FIG. 1 illustrates a system 1000 in accordance with at least some embodiments. In particular, system 1000 comprises an electronic system 10 coupled to a RFID reader 12. In some embodiments, electronic system 10 comprises a computer system. By way of antenna 14, the RFID reader 12 communicates with one or more RFID tags 16A-16C proximate to the RFID reader (i.e., within communication range). The RFID reader 12 may be equivalently referred as an interrogator. The RFID reader 12 passes data obtained from the various RFID tags 16 to the electronic system 10, which performs any suitable function. For example, the electronic system 10, based on the data received from the RFID tags 16, may allow access to a building or parking garage, note the entrance of an employee to a work location, direct a parcel identified by the RFID tag 16 down a particular conveyor system, or display an advertisement customized or targeted to the person identified by the RFID tag 16.

There are several types of RFID tags operable in the illustrative system 1000. For example, RFID tags may be active tags, meaning each RFID tag comprises its own internal battery. Using power from the internal battery, an active RFID tag monitors for interrogating signals from the RFID reader 12. When an interrogating signal is sensed, a response comprising a data or identification value is transmitted by the active RFID tag using power from its internal battery. A semi-active tag may likewise have its own internal battery, but a semi-active tag stays dormant most of the time. When an antenna of a semi-active tag receives an interrogating signal, the power received is used to wake or activate the semi-active tag, and a response comprising an identification value is sent by the semi-active RFID tag using power from its internal battery.

A third type of RFID tag is a passive tag, which, unlike active and semi-active RFID tags, has no internal battery. The antenna of the passive RFID tag receives an interrogating signal, and the power extracted from the received interrogating signal is used to power the tag. Once powered, the passive RFID tag may either of both of accept a command, or send a response comprising a data or identification value; however, the value is sent in the form of backscattered electromagnetic waves to the RFID reader 12 antenna 14 from the antenna 17 of the RFID tag 16. In particular, the RFID reader 12 and antenna 14 continue to transmit power after the RFID tag is awake. While the RFID reader 12 transmits, the antenna 17 of the RFID tag is selectively tuned and de-tuned with respect to the carrier frequency. When tuned, significant incident power is absorbed by the antenna 17 of the RFID tag 16 (and is used to power the underlying circuits). When de-tuned, significant power is reflected by the antenna 17 of the RFID tag 16 to the antenna 14 of the RFID reader 12. The data or identification value thus modulates the carrier in the form of reflected or backscattered electromagnetic wave. The RFID reader 12 reads the data or identification value from the backscattered electromagnetic waves. Thus, in this specification and in the claims, the terms transmitting and transmission include not only sending from an antenna using internally sourced power, but also sending in the form of backscattered signals.

Regardless of the type of RFID tag used (i.e., active, semi-active or passive) for the RFID reader 12 to interrogate the tag and receive return data, the antenna 17 of the RFID tag 16 is tuned to substantially the proper frequency, and the antenna directivity of the RFID tag 16 is in at least partial alignment with directivity of the antenna 14 of the RFID reader 12. However, dipole antennas and loop antennas tuned for free space tend to de-tune when placed proximate to metallic articles or water (e.g. a human or animal body). Moreover, directivity of the transmission (or receipt) of electromagnetic waves of dipole antennas and loop antennas degrades when the antennas are placed proximate to metallic articles or water. For example, a RFID tag in the form of an employee badge suspended proximate to the body may de-tune and/or have its antenna directivity affected to the extent that the RFID tag becomes unreadable when the RFID tag uses dipole or loop antennas.

Figure 2:
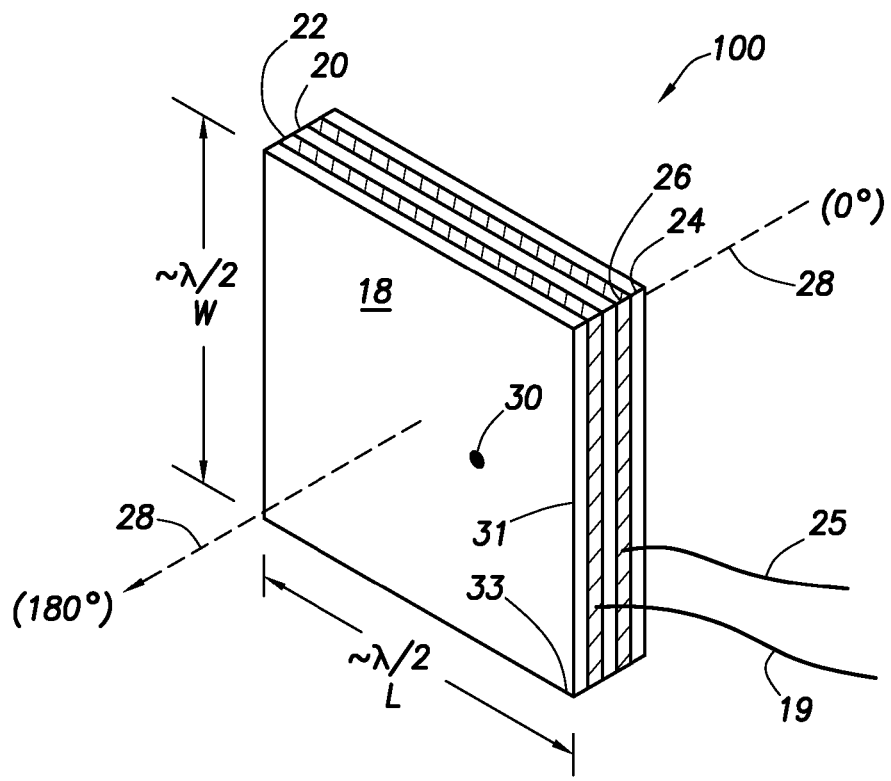
FIG. 2 shows a dual-sided patch antenna in accordance with at least some embodiments.

The various embodiments herein address the difficulties discussed above employing an antenna 17 in the RFID tag 16 that is quasi-omnidirectional and that is unaffected, or only slightly affected, by placement proximate to a metallic object or water. In particular, FIG. 2 shows a perspective view of a dual-sided patch antenna 100 in accordance with at least some embodiments. The dual-sided patch antenna 100 comprises a first radiative patch or antenna element 18. The antenna element 18 comprises a sheet of metallic material (e.g. copper) in the form of a square or rectangle in this example. The length and width of the antenna element 18 is dictated by the wavelength of the radio frequency signal that will be driven to the antenna element 18 (or that will be received by the antenna element 18), for example driven by way of lead 19. More particularly, the length and width of the antenna element 18 are each an integer ratio of the wavelength of the signal to be transmitted (or received). For example, the length and width may be approximately half the wavelength ($\lambda/2$) or a quarter of the wavelength ($\lambda/4$).

The dual-sided patch antenna 100 also comprises a ground plane or ground element 20. The antenna element 18 and the ground element 20 each define a plane, and those planes are substantially parallel in at least some embodiments. In FIG. 2, the ground element 20 length and width and the antenna element 18 length and width are shown to be approximately the same; however, the ground element length and width may be larger or smaller in other embodiments. Although the antenna element 18 and ground element 20 may be separated by air, in some embodiments a dielectric material 22 (e.g. printed circuit board material, silicon, plastic) separates the antenna element 18 from the ground element 20.

Still referring to FIG. 2, the dual-sided patch antenna 100 further comprises a second radiative patch or antenna element 24. Much like antenna element 18, the antenna element 24 comprises a sheet of metallic material (e.g. copper) in the form of a square or rectangle in this example. The antenna element 24 defines a plane, and in some embodiments the plane defined by antenna element 24 is substantially parallel to the plane defined by ground element 20 in some embodiments. The length and width of the antenna element 24 is dictated by the wavelength of the radio frequency signal that will be driven to the antenna element 24, for example driven by way of lead 25, and in some embodiments the length and width as between the antenna elements 18 and 24 are the same. Although the antenna element 24 may be separated from the ground element 20 by air, in other embodiments a dielectric material 26 (e.g. printed circuit board material, silicon, plastic) separates the antenna element 24 from the ground element 20. Each antenna element 18, 24 comprises a centroid axis 28 (i.e., centroid being the point considered to be the center), and in some embodiments the centroid axis 28 of each antenna element are substantially coaxial.

Radio frequency signals are driven to each of the antenna elements 18 and 24 by way of probe feeds or feed points (i.e., the locations where the radio frequency signals couple to the antenna elements), such as feed point 30 for antenna element 18 (the feed point for antenna element 24 not visible in FIG. 2). The feed points are coupled to their respective leads 19 (for feed point 30) and 25 (for the feed point of the antenna element 24). The following discussion is directed to antenna element 18 and feed point 30, but the discussion is equally applicable to antenna element 24. As illustrated, the feed point 30 resides within (internal of) an area defined by the length and width of the antenna, and the internal location of the feed point is selected based on several criteria. One such criterion is the impedance seen by a radio frequency source that drives the antenna element 18. For example, shifting the feed point toward the center of the antenna element 18 along its length ("L" in the figure) tends to lower the impedance seen by the radio frequency source, while shifting along the length towards an edge (e.g. edge 31) tends to increase impedance seen by the radio frequency source. Moreover, the placement of the feed point 30 also controls polarity of the electromagnetic wave created. For example, the feed point 30 as shown creates an electromagnetic wave whose electric field polarization is substantially along the length L. Shifting the feed point toward a corner (e.g. corner 33), or also using a second feed point centered along the length, creates a circularly polarized electromagnetic wave. Thus, the feed points are internal to the length and width to meet these, and possibly other, design criteria. The discussion now turns to directivity of the dual-sided patch antenna.

Figure 3A:
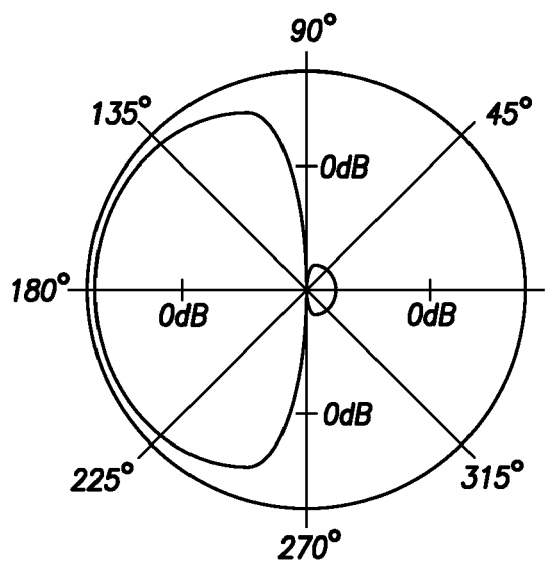
FIGS. 3A and 3B show far-field radiation (or reception) patterns for the antenna elements of the dual-sided patch antenna considered individually.
Figure 3B:
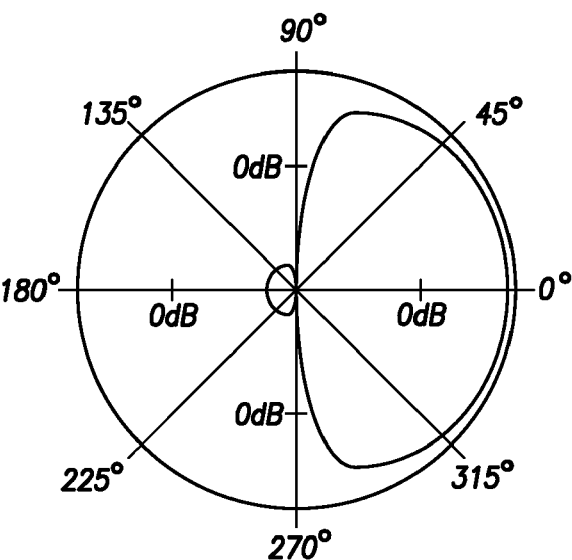
Figure 4:
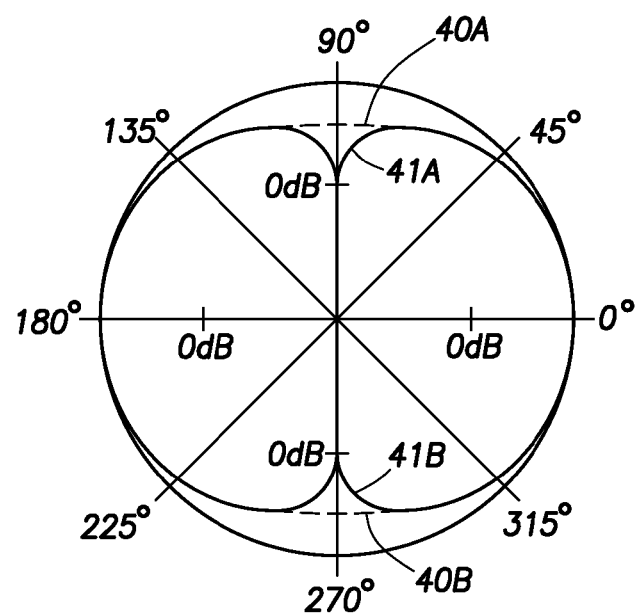
FIG. 4 shows the far-field radiation (or reception) pattern for the dual-sided patch antenna of various embodiments.

Consider for purposes of explanation that the centroid axis 28 lies along the 0°-180° axis in an overhead view (i.e., looking down on the length L from above) of the dual-sided antenna of FIG. 2, and that antenna element 18 faces the 180° direction while antenna element 24 faces the 0° direction. FIGS. 3A and 3B illustrate a far-field radiation pattern for each of the antenna elements 18 and 24 respectively. In particular, FIG. 3A shows that antenna element 18 considered alone has a far-field radiation pattern that is substantially directed along the centroid axis away from the ground element 20. The plot of FIG. 3A is valid for both overhead and elevational (i.e., looking horizontally toward the width W) plots of far field radiation. Likewise, antenna element 24 considered alone has a far-field radiation pattern that is substantially directed along the centroid axis away ground element 20, and the plot (of FIG. 3B) is equally valid for both overhead and elevational plots of far-field radiation. Considering the far-field radiation patterns of antenna element 18 and antenna element 24 together, the dual-sided patch antenna 100 has a quasi-omnidirectional radiation (or reception) pattern, as illustrated in FIG. 4, with FIG. 4 equally valid for both overhead and elevational plots of far-field radiation. Stated otherwise, the far-field radiation pattern for the dual-sided patch antenna is substantially the same in all three spatial directions.

The far-field radiation patterns of FIGS. 3A, 3B and 4 show directivity, but one or more parameters of the physical system may affect the ultimate far-field radiation pattern. For example, ground elements larger than the antenna elements 18, 24 increase the size of the dips 41A and 41B at the 90° and 270° orientations, while a ground element the same size or slightly smaller may make the radiation pattern more circular (as indicated by dashed lines 40A and 40B). The far-field radiation patterns of FIGS. 3A, 3B and 4 also show gain (in decibels (dB)), but no specific numbers except that the gain may be greater than 0 dB in all directions. The actual gain values are related to parameters of the physical system such as frequency of operation and the dielectric strength of the dielectric material 22 and 26.

Although the radiation pattern illustrated in FIG. 4 is at least quasi-omnidirectional, an RFID tag comprising a dual-sided patch antenna, such as antenna 100, experiences less detrimental affects on tuning and directivity when placed proximate to a metallic article or water, as compared to single-sided patch antennas, dipole antennas and loop antennas. The benefits are especially noticeable when the antenna elements 18 and 24 are electrically isolated (discussed more below), thereby limiting interaction that allows one antenna element performance to affect the other. That is, while one antenna element 18 of the illustrative embodiments of FIG. 2 may be shielded between the metallic article or body and the ground element, the second antenna element 24 is relatively unaffected by the presence of the metallic article or body because of the electromagnetic isolation provided by the ground element. The amount of effect the non-shielded antenna element experiences are dependent to some extent upon how the antenna elements 18 and 24 are coupled to the underlying components.

Figure 5:
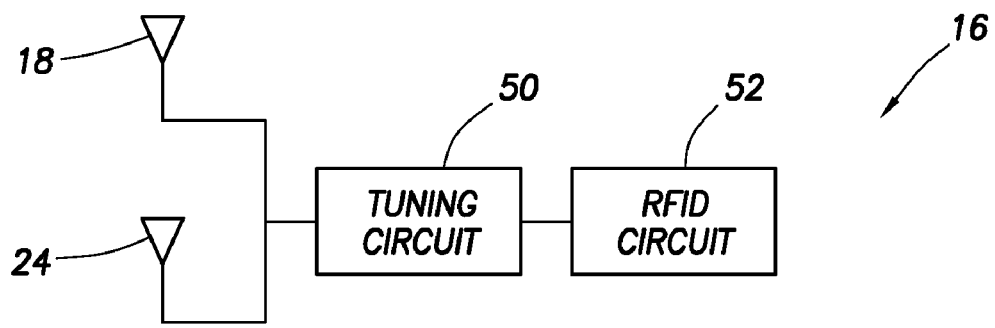
FIG. 5 shows an electrical block diagram of circuitry for coupling to the dual-sided patch antenna in accordance with at least some embodiments.

FIG. 5 illustrates an electrical block diagram of antenna elements 18 and 24 of a dual-sided patch antenna 100 coupled to underlying components. In particular, in the embodiments of FIG. 5 the antenna elements 18 and 24 are coupled together, and are coupled to a matching or tuning circuit 50. The purpose of the tuning circuit is to tune the two coupled antennas to be resonant at a particular frequency or set of frequencies. The turning circuit, in turn, is coupled to an RFID circuit 52. The tuning circuit 50 and RFID circuit 52 may comprise an integrated product, such as the MCRF42X family of products available from Mirochip Technologies, Inc. of Chandler, Ariz. The RFID circuit 52 holds the identification value or values, and is responsible for transmitting the value to the reader (i.e., through broadcasting using power from in internal battery, or by backscatter using power from the interrogating signal). Embodiments as disclosed in FIG. 5 are operational, but when the one antenna element is placed proximate to a metallic article or water, the detuning effects of the placement affect the other antenna element, though not to the extent experienced by a dipole or loop antenna.

Figure 6:
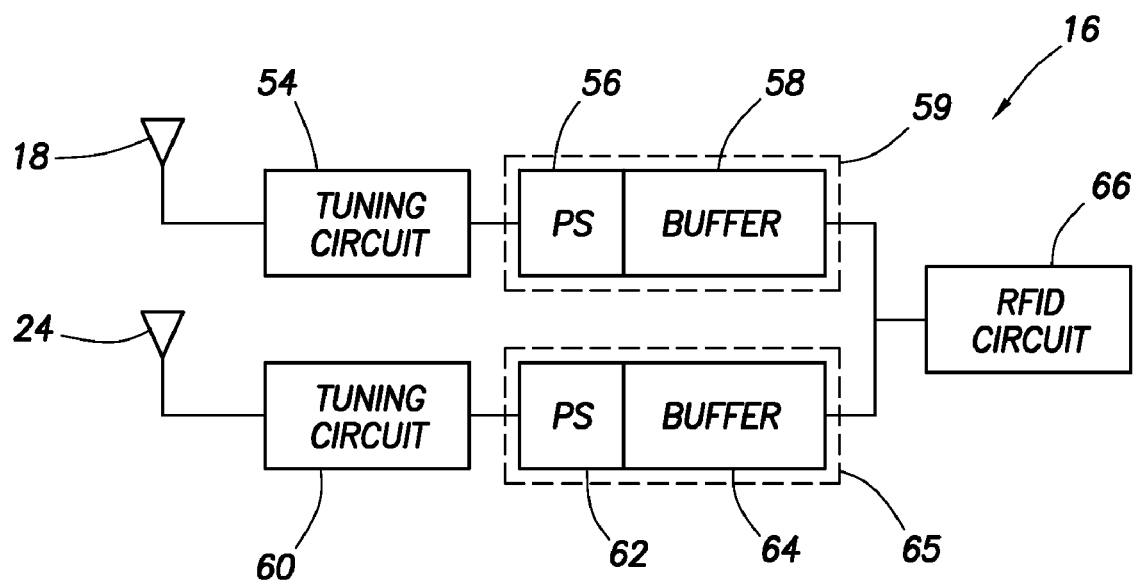
FIG. 6 shows an electrical block diagram of circuitry for coupling to the dual-sided antenna in alternative embodiments.

In alternative embodiments, the effects of placement of one antenna element proximate to a metallic article or water are reduced by electrically isolating the two antenna elements 18, 24 from each other. FIG. 6 shows an electrical block diagram of alternative embodiments where the two antenna elements of the dual-sided patch antenna 100 are electrically isolated from each other by way of additional isolation circuits. In particular, antenna 18 is coupled to tuning circuit 54, which in turn couples to an additional isolation circuit 59 and RFID circuit 66. In these embodiments, the isolation circuit 59 may comprise one or more of a power supply (PS) 56 and optional additional buffer 58. Likewise, antenna 24 is coupled to tuning circuit 60, which in turn couples to isolation circuit 65 and RFID circuit 66. Further in these embodiments, the isolation circuit 65 may comprise one or more of a power supply (PS) 62 and an optional additional optional additional buffer 64. Operation of the power supply and buffer is discussed with respect to antenna 18, but the discussion is equally applicable to antenna 24. When antenna 18 is not exposed to an interrogating signal from a RFID reader 12 (FIG. 1), the buffer 58 electrically isolates (or de-couples) the antenna element 18 from the RFID circuit 66. However, when exposed to interrogating signal, the buffer 58 couples the antenna 18 to the RFID circuit 66. In active tags, a battery may be the power supply 56 to provide power to sense electromagnetic signals received by the antenna element 18, and to control the additional buffer 58. Because the power supply 56 may be self powered, the location of the power supply 56 and the buffer 58 may be reversed. Moreover, a rectifying circuit may be present either in the power supply 56 or buffer 58 to convert incoming data and commands to baseband data. Using battery power, the buffer 58 continuously or periodically determines if antenna element 18 is receiving an interrogating signal. If so, the buffer 58 couples the antenna element 18 the RFID circuit 66 (e.g. by biasing the gate of a transistor to allow coupling of at least a portion of the interrogating signal to the RFID circuit 66), with power to run the buffer provided from the battery.

In semi-active and passive tags, the power supply 56 rectifies received power from the interrogating signal, converts the received power to direct current (DC) (e.g. using Schottky diodes), and uses at least some of the converted power to control the buffer 58. For example, the buffer 58 may be configured to electrically isolate the antenna element 18 from the RFID circuit 66 when no power is provided from the power supply 56 (i.e., when there is no interrogating signal being received by the antenna element). When an interrogating signal is incident upon the antenna element 18, the power supply 56 extracts power from the signal, and uses the power to drive the buffer and couple the antenna element 18 to the RFID circuit 66. Thus, regardless of the tag type, when an interrogating signal is received on antenna element 18, the signal is coupled to the RFID circuit 66, which responds to the reader 12 (FIG. 1) with an identification value.

Consider now a situation of a RFID tag 16 comprising the circuits as shown in FIG. 6, with the RFID tag located proximate to a metallic article or water. In particular, FIG. 7 shows an elevational cross-sectional view of a badge 69 comprising a dual-sided patch antenna 100, with the badge 69 proximate to a body 67. Antenna element 24 resides between the ground element 20 and the body 67, while antenna element 18 faces away from the body 67. When the RFID tag 16 is exposed to an interrogating signal from a RFID reader 12, very little if any of the interrogating signal is received by antenna element 24, and thus the buffer 64 (FIG. 6) keeps antenna element 24 de-coupled from the RFID circuit 66. However, antenna element 18 faces the opposite direction and receives power from the interrogating signal. At least a portion of the received power is converted by power supply 56 (in semi-active and passive tags), and the buffer 58 couples the antenna element 18 to the RFID circuit 66. Here, however, because of the electrical isolation of the antenna element 24 from antenna element 18, any detuning effects of antenna element 24 resulting from its placement does not affect antenna element 18. With the situation reversed, and antenna element 18 shielded between the object and the ground element 20, antenna element 24 receives the interrogating power and becomes the active antenna element.

Figure 8:
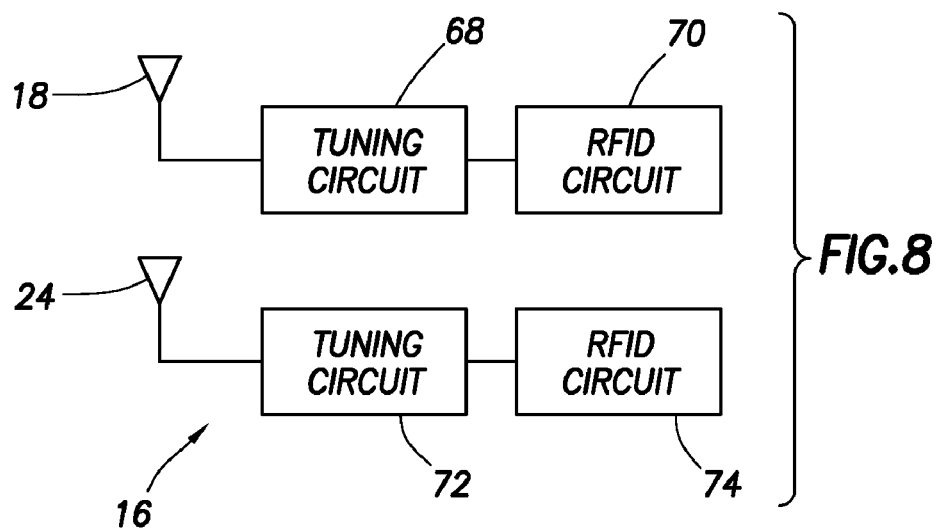
FIG. 8 shows an electrical block diagram of circuitry for coupling to the dual-sided antenna in further alternative embodiments.

FIG. 8 illustrates yet still further alternative embodiments of a RFID tag 16. In particular, in the embodiments illustrated in FIG. 8 each antenna element 18, 24 of the dual-sided patch antenna 100 couples to its own tuning circuit and RFID circuit. Antenna element 18 couples to tuning circuit 68 and RFID circuit 70, while antenna element 24 couples to tuning circuit 72 and RFID circuit 74. Much like the embodiments of FIG. 6, in the embodiments of FIG. 8 the detuning effects of one antenna element being proximate to an object does not affect tuning of the antenna element on the opposite side of the ground element 20, thus achieving near total isolation of the two antenna elements. RFID circuits 70 and 74 may be designed and configured to hold and provide the same identification values when interrogated, or different values. Thus, when interrogated the RFID circuits 70 and 74 may respond with the same value, or with different values. Further, the two RFID circuits may be coupled in order to share data or to enable other functionality.

FIG. 9 illustrates a method in accordance with at least some embodiments. In particular, the method starts (block 900) and proceeds to isolating the first antenna element of a RFID tag from a RFID circuit (block 904). The isolating may take many forms. In some embodiments, the isolating is by way electrically decoupling the first antenna element from the RFID circuit, such as by isolation circuits described above. In semi-active and passive circuits, the power supply rectifies incoming interrogating signals to extract power therefrom. When the power extracted is below a predetermined threshold (e.g. enough power to operate the buffer circuit in passive tags), then the first antenna element remains de-coupled. When the power reaches the predetermined threshold, the buffer circuit electrically couples the first antenna to the RFID circuit. In other embodiments, isolating the first antenna element from the RFID circuit is accomplished by providing separate and independent RFID circuits for each antenna element. Regardless of the precise mechanism used to isolate, the next step is transmitting a value responsive to an interrogating signal from a second antenna element of the RFID tag (block 908), the second antenna element coupled to the RFID circuit. Thereafter, the method ends (block 912).

The dual-sided patch antenna 100 of FIG. 2 may be constructed in several ways. In some embodiments, the antenna 100 may be constructed using flexible sheets of metallic and dielectric material adhered together and cut to appropriate dimensions. In alternative embodiments, the antenna 100 may be manufactured, such as by deposition of the metallic portions and growth of dielectric portions by way of semiconductor manufacturing techniques. In yet still other embodiments, the antenna 100 may be constructed using a combination of techniques, such as depositing metallic layers on a dielectric material such as a printed circuit board (PCB), and then mechanically coupling two or more PCBs to form the antenna.

The above discussion is meant to be illustrative of the principles and various embodiments of the present invention. Numerous variations and modifications will become apparent to those skilled in the art once the above disclosure is fully appreciated. For example, the antenna elements or radiative patches need not be square, and other shapes (e.g. circular, rectangular but with slots cut such that the patch takes an "E" shape, or an "F" shape, dipole and loop antennas) may be equivalently used. Further, while the antenna 100 is shown with a single ground element 20, a dual-sided patch antenna 100 may be manufactured by adhering two patch antennas back-to-back. For example, FIG. 10 shows an elevational view of a dual-sided patch antenna 200 comprising antenna elements 202 and ground element 202 separated by a dielectric material 204. Dual-sided patch antenna 200 further comprises a second antenna element 206 and ground element 208 separated by a dielectric material 210. Thus, dual-sided patch antenna may be construed by coupling two single-sided patch antennas by way of the ground elements 202 and 208. The coupling can be by electrically coupling the two ground elements 202 and 208, or the two ground elements may be mechanically but not electrically coupled. It is intended that the following claims be interpreted to embrace all such variations and modifications.

What is claimed is:

1. A radio frequency identification (RFID) tag comprising:
   an antenna system comprising:
      a ground plane;
      a first antenna element on a first side of the ground plane; and
      a second antenna element on a second side of the ground plane opposite first antenna element, the second antenna element being electrically coupled to the first antenna element at a common feed point, wherein the first antenna element and the second antenna element each receive radio frequency signals; and
   a first radio frequency identification circuit coupled to the first antenna element and the second antenna element at the common feed point.

2. The RFID tag as defined in claim 1 wherein each of the first and second antenna elements comprises a patch of conductive material having a length and a width equal to or smaller than a length and width of the ground plane.

3. An apparatus comprising:
   a first radiative patch;
   a second radiative patch, wherein the second radiative path is electrically coupled to the first radiative patch, the first radiative patch and the second radiative patch sharing a common feed point for receiving a radio frequency signal that drives the first radiative patch and the second radiative patch; and
   a ground element disposed between the first and second radiative patches and electrically isolated from the radiative patches.

4. The apparatus as defined in claim 3 further comprising a first layer of dielectric material coupled between the first radiative patch and the ground element.

5. The apparatus as defined in claim 4 further comprising a second layer of dielectric material coupled between the second radiative patch and the ground element.

6. The apparatus as defined in claim 3 further comprising a radio frequency identification circuit coupled to both the first and second radiative patches, and when an interrogating signal is incident upon at least one of the radiative patches, the radio frequency identification circuit responds with a value.

7. The apparatus as defined in claim 6 wherein the radio frequency identification circuit responds with the value by selective detuning of at least one of the radiative patches.

8. The apparatus as defined in claim 3 wherein the first radiative patch comprises a centroid axis normal to a plane defined by the first radiative patch; and wherein the second radiative patch comprises a centroid axis normal to a plane defined by the second radiative patch and substantially coaxial with the centroid axis of the first radiative patch.

9. A system comprising:
a first means for receiving and sending electromagnetic waves;
a second means for receiving and sending electromagnetic waves, the first and second means for receiving sharing an internally disposed means for insertion of a driving signal; and
a means for limiting directionality of electromagnetic waves, the means for limiting being disposed between the first and second means for receiving, and the means for limiting being electrically isolated from the first and second means for receiving;
wherein the first and second means for receiving are each configured to be driven at the means for insertion with a radio frequency signal.

10. The system as defined in claim 9 further comprising:
a first means for responding to interrogating signals, the first means for responding coupled to the first means for receiving; and
a second means for responding to interrogating signals, the second means for responding coupled to the second means for receiving.

11. The system as defined in claim 10 wherein the first and second means for responding, in response to interrogating signals, one or more selected from the group consisting of: respond identically; or respond such that the first means for receiving is distinguishable from the second means for receiving.

12. The system as defined in claim 9 further comprising a means for responding to interrogating signals, the means for responding coupled to both the first and second means for receiving.

* * * * *

UNITED STATES PATENT AND TRADEMARK OFFICE
CERTIFICATE OF CORRECTION

| | |
|---|---|
| PATENT NO. | : 8,031,054 B2 |
| APPLICATION NO. | : 11/691822 |
| DATED | : October 4, 2011 |
| INVENTOR(S) | : John R. Tuttle |

It is certified that error appears in the above-identified patent and that said Letters Patent is hereby corrected as shown below:

Column 1, line 18, delete the word "and".
Column 2, line 2, after "comprising" insert the word --a--.
Column 2, line 32, "a RFID" should read --an RFID--.
Column 2, line 48, "a RFID" should read --an RFID--.
Column 3, line 16, first occurrence of the word "of" should read --or--; delete second occurrence of the word "of".
Column 3, line 48, "a RFID" should read --an RFID--.
Column 3, line 63, "element 18 is" should read --element 18 are--.
Column 4, line 24, "element 24 is" should read --element 24 are--.
Column 4, line 37, "element are" should read --element is--.
Column 5, line 13, "far field" should read --far-field--.
Column 5, line 15, "axis away" should read --axis away,--.
Column 5, line 56, "experiences are" should read --experiences is--.
Column 6, line 31, "a RFID" should read --an RFID--.
Column 6, line 38 to Column 6, line 39, "self powered" should read --self-powered--.
Column 6, line 44, "element 18" should read --element 18 to--.
Column 6, line 66, "a RFID" should read --an RFID--.
Column 7, line 7, "a RFID" should read --an RFID--.
Column 7, line 24, "a RFID" should read --an RFID--.
Column 7, line 31, "an object does" should read --an object do--.
Column 7, line 43, "a RFID" should read --an RFID--.
Column 7, line 44, "a RFID" should read --an RFID--.
Column 7, line 45, "by way electrically" should read --by way of electrically--.
Column 8, line 42, "opposite first" should read --opposite the first the first--.
Column 8, line 56, "radiative path" should read --radiative patch--.

Signed and Sealed this
Sixteenth Day of October, 2012

David J. Kappos
*Director of the United States Patent and Trademark Office*